(12) United States Patent
Jagota

(10) Patent No.: US 12,323,053 B2
(45) Date of Patent: Jun. 3, 2025

(54) AUTOMATIC RATING ADJUSTMENT FOR POWER CONVERTER MODULES

(71) Applicant: AcLeap Power Inc., Taipei (TW)

(72) Inventor: Anurag Jagota, Allen, TX (US)

(73) Assignee: AcLeap Power Inc., Taipei (TW)

( * ) Notice: Subject to any disclaimer, the term of this patent is extended or adjusted under 35 U.S.C. 154(b) by 274 days.

(21) Appl. No.: 18/181,283

(22) Filed: Mar. 9, 2023

(65) Prior Publication Data
US 2024/0305189 A1 Sep. 12, 2024

(51) Int. Cl.
*H02M 1/32* (2007.01)
*H02M 3/00* (2006.01)
*H02M 7/00* (2006.01)

(52) U.S. Cl.
CPC .......... *H02M 1/327* (2021.05); *H02M 3/003* (2021.05); *H02M 7/003* (2013.01)

(58) Field of Classification Search
CPC ....... H02M 1/327; H02M 3/003; H02M 7/003
USPC ........................................................ 363/282
See application file for complete search history.

(56) References Cited

U.S. PATENT DOCUMENTS

| | | | |
|---|---|---|---|
| 2012/0053859 A1* | 3/2012 | Liu | G01R 31/2817 702/45 |
| 2019/0257861 A1* | 8/2019 | Breitlow | H01L 21/67248 |
| 2019/0277704 A1* | 9/2019 | Burger | G01K 1/026 |
| 2024/0272688 A1* | 8/2024 | Rajagopal | G06F 1/324 |

OTHER PUBLICATIONS

"12A Digital Pico SlimLynxTM Open Frame: Non-Isolated DC-DC Modules Data Sheet," General Electric Company, pp. 1-39, Version 1.9, Aug. 17, 2020.
"EBDW025A0B Barracuda* Series; DC-DC Converter Power Modules Data Sheet," ABB Power Conversion, pp. 1-41, Plano, TX, 2021.

* cited by examiner

*Primary Examiner* — Yemane Mehari
(74) *Attorney, Agent, or Firm* — McCarter & English, LLP

(57) ABSTRACT

In one aspect, a method operable by a controller of a power converter module is provided. The method comprises identifying thermal test data for the power converter module, where the thermal test data maps one or more operating conditions of the power converter module to temperature triggers associated with a monitored device of the power converter module. The method further comprises measuring, utilizing a temperature sensor disposed external to and away from the monitored device, a temperature, and identifying the one or more operating conditions of the power converter module. The method further comprises identifying, from the thermal test data utilizing the one or more operating conditions, a temperature trigger for the monitored device, determining whether the temperature is greater than or equal to the temperature trigger, and performing a responsive action in response to determining that the temperature is greater than or equal to the temperature trigger.

20 Claims, 7 Drawing Sheets

AUTOMATIC RATING ADJUSTMENT FOR POWER CONVERTER MODULES

BACKGROUND

The field of the disclosure relates to power converter modules, and in particular, to automatically adjusting the output rating of power converter modules based on the operating conditions of the power converter modules.

Power converter modules may be fabricated and sold as stand-alone devices for use by customers as power converter solutions in their own system boards. For example, a power converter module may include a printed circuit board (PCB) with capacitors, inductor(s), power switches, etc., mounted on the PCB. The PCB of a power converter module may also include pins or other surface mount features that allow the power converter module to be mounted to the customer's system board during assembly of the customer's system board.

Generally, power converter modules are tested by the manufacturer under different operating conditions in order to generate performance data and/or module power ratings. For example, a manufacturer of the power converter module may derate the power rating of the power converter module based on changes in airflow, airflow directions, and ambient temperature. As a result, the customer purchasing the power converter module is tasked to review the manufacturer data and operate and/or derate the power converter module based on the expected operating conditions for the power converter module.

However, when a power converter module is operating on a customer's system board, there may be differences in the allowable output ratings of the power converter module due to unanticipated operating conditions within, for example, the customer's product.

Thus, it would be desirable to provide mechanisms for dynamically adjusting the ratings of power converter modules in order to improve the long-term reliability of power converter modules within the customer's products.

BRIEF DESCRIPTION

In one aspect, a controller for a power converter module is provided. The controller comprises a memory and a processor. The memory is configured to store thermal test data for the power converter module, where the thermal test data maps one or more operating conditions of the power converter module to temperature triggers associated with a monitored device of the power converter module. The processor is configured to identify, from the memory, the thermal test data, and measure, utilizing a temperature sensor disposed external to and away from the monitored device, a temperature. The processor is further configured to identify the one or more operating conditions of the power converter module, and identify, from the thermal test data utilizing the one or more operating conditions, a temperature trigger for the monitored device. The processor is further configured to determine whether the temperature is greater than or equal to the temperature trigger, and to perform a responsive action in response to determining that the temperature is greater than or equal to the temperature trigger.

In another aspect, a method operable by a controller of a power converter module is provided. The method comprises identifying thermal test data for the power converter module, where the thermal test data maps one or more operating conditions of the power converter module to temperature triggers associated with a monitored device of the power converter module. The method further comprises measuring, utilizing a temperature sensor disposed external to and away from the monitored device, a temperature, and identifying the one or more operating conditions of the power converter module. The method further comprises identifying, from the thermal test data utilizing the one or more operating conditions, a temperature trigger for the monitored device, determining whether the temperature is greater than or equal to the temperature trigger, and performing a responsive action in response to determining that the temperature is greater than or equal to the temperature trigger.

In another aspect, a power converter module is provided. The power converter module comprises a printed circuit board (PCB), at least one input power terminal coupled to the PCB, at least one output terminal coupled to the PCB, a power stage, a temperature sensor, and a controller. The power stage is coupled to the PCB and is configured to convert an input power applied to the at least one input power terminal to an output power supplied to the at least one output power terminal. The temperature sensor is coupled to the PCB and disposed external to and away from a component of the power stage. The controller is configured to identify thermal test data for the power converter module that maps one or more operating conditions of the power converter module to temperature triggers associated with the component of the power stage. The controller is further configured to measure, utilizing the temperature sensor, a temperature, and identify the one or more operating conditions of the power converter module. The controller is further configured to identify, from the thermal test data utilizing the one or more operating conditions, a temperature trigger for the component of the power stage, determine whether the temperature is greater than or equal to the temperature trigger, and perform a responsive action in response to determining that the temperature is greater than or equal to the temperature trigger.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

Figure 1:
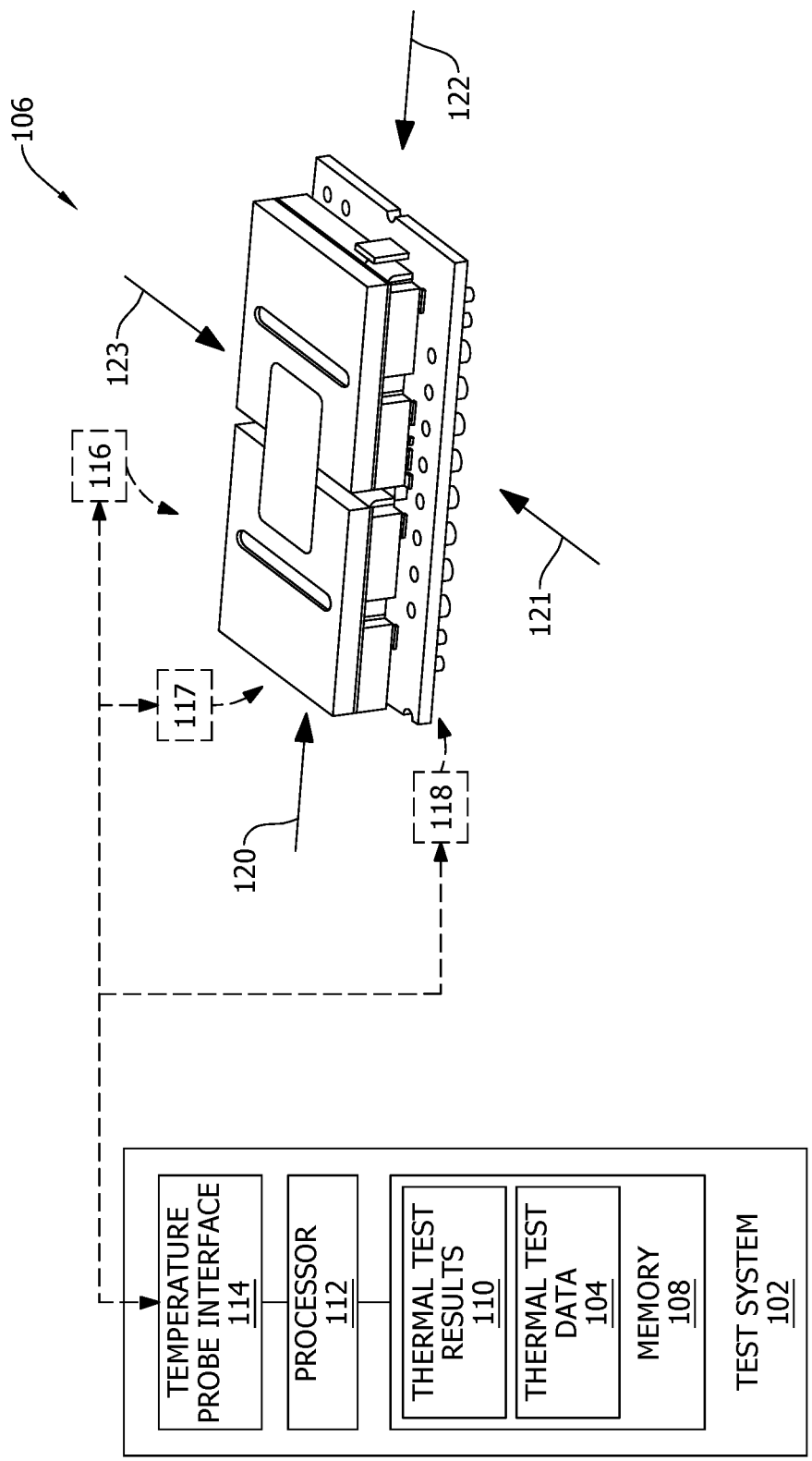
FIG. 1 depicts a block diagram of a test system for generating thermal test data for a power converter module in an exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As discussed previously, when a power converter module is operating on a customer's system board, there may be differences in the output rating of the power converter module as compared to the test data generated for the power converter module by the manufacturer. For example, the manufacturer of the power converter module may specify a particular orientation of the power converter module in airflow, in order to support a particular output current or output power rating of the power converter module. However, the customer may not be able to orient the power converter module as expected, and as a result, the output rating of the power converter module may differ in the customer's application from what the test data generated by the manufacturer suggests. The result is that the life and/or the reliability and/or the safety of the power converter module in the customer's application may be negatively impacted.

In the embodiment described herein, thermal test data for the power converter module is generated in a test environment, and is stored in a local memory of the power converter module. The thermal test data maps the operating conditions of the power converter module to temperature triggers associated with monitored devices of the power converter module. The temperature triggers are compared with temperature sensor(s) located on the power converter module that have been pre-characterized during the thermal testing to identify their thermal relationships with the monitored components (e.g., the temperature sensor(s) act as temperature proxies for the monitored components).

For example, if the power converter module includes a temperature sensor near an output capacitor for the power converter module, then the thermal test data generated for the power converter module may include, for example, a lookup table that maps the various operation conditions of the power converter module to temperature triggers for the output capacitor. The current operating conditions of the power converter module may include, for example, one or more of the input current for the power converter module, the output current of the power converter module, the input voltage of the power converter module, the output voltage of the power converter module, and an operating frequency of a power stage of the power converter module, etc. Generally, the operating conditions include the electrical parameters that are measurable by the power converter module itself, such as currents, voltages, and frequencies, and may exclude parameters that are not easily measured by the power converter module, such as airflow rates, airflow directions, and ambient temperatures (e.g., the measurement of an ambient temperature by the power converter module may be impractical due to the heat generated by the power converter module).

The thermal test data may, for example, map the operating conditions of the power converter module to temperature triggers associated with the capacitor, such that the temperature sensor operates as a temperature proxy for the capacitor in order to maintain the temperature of the capacitor at or below a pre-defined limit by, for example, derating the output of the power converter module when the temperature trigger is reached.

In the example, the temperature sensor may operate as a temperature proxy for multiple devices being monitored on the power converter module, with the thermal test data mapping the operating conditions of the power converter module to multiple components being monitored. However, multiple temperature sensors may be disposed at different locations around the PCB of the power converter module, each associated with one or more monitored components on the power converter module.

As discussed above, the thermal test data may comprise a multi-variable lookup table that varies the temperature triggers associated with the monitored components as the operating conditions change over time. Thus, characterizing the thermal performance of the power converter module in a test environment under varying operating conditions, airflows, ambient temperatures, and orientations is used to generate the thermal test data for a particular design of the power converter module.

FIG. 1 depicts a block diagram of a test system 102 for generating thermal test data 104 for a power converter module 106 in an exemplary embodiment. In this embodiment, test system 102 includes a memory 108, storing thermal test data 104 and thermal test results 110, at least one processor 112, and a temperature probe interface 114. Temperature probe interface 114 is electrically coupled to thermocouples 116, 117, 118, which are thermally coupled (e.g., using thermal paste) to one or more components of power converter module 106 during thermal testing of power converter module 106 (e.g., thermocouples 116, 117, 118 are not permanent components of power converter module 106 in a post-assembly version of power converter module 106).

Although three thermocouples 116, 117, 118 are shown in FIG. 1, test system 102 may utilize more or fewer thermocouples 116, 117, 118 in other embodiments depending on the number of components of power converter module 106 that are monitored and/or the number of temperature sensors that are or will be included in power converter module 106. Thermocouples 116, 117, 118 may be thermally coupled to various components of power converter module 106 as desired. The components monitored by thermocouples 116, 117, 118 during thermal testing of power converter module 106 may include, for example, a solid-state switch, a capacitor, a transformer, a heatsink, a cold plate, a PCB, an inductor, etc. In some embodiments, one or more of thermocouples 116, 117, 118 may be used to measure predefined locations on power converter module 106 where electronic temperature sensors (not shown) are or will be located in order to determine the temperatures at the predefined locations. In other embodiments, test system 102 communicates with one or more electronic temperature sensors on power converter module 106 in order to monitor the temperatures measured by the electronic temperature sensors during thermal testing.

During thermal testing, test system 102 generates thermal test results 110 as power converter module 106 operates over various input/output voltages and currents, as the ambient temperature changes, as an airflow rate varies across power converter module 106, and as airflow directions 120, 121, 122, 123 change. Thermal test results 110 generated by test system 102 characterize how various monitored components where thermocouples 116, 117, 118 are temporarily attached respond as the operating conditions of power converter module 106 varies, the airflow across power converter module 106 varies in speed, the airflow varies in different airflow directions 120, 121, 122, 123, and the ambient temperature changes.

For example, if thermocouple 116 is thermally coupled to an output capacitor of power converter module 106 (the temperature of which is impractical to measure directly during normal operation of power converter module 106), and thermocouple 118 is thermally coupled to a pre-defined location on power converter module 106 where an electronic temperature sensor is or will be located, then thermal test results 110 characterize the temperature relationships between the output capacitor and the electronic temperature sensor as the operating conditions of power converter module 106 are varied in the test environment during thermal testing. Thermal test results 110 may include, for example, multiple entries, each associated with a different combination of operating conditions, airflow rates, and airflow directions 120, 121, 122, 123 along with the temperatures measured by thermocouples 116, 117, 118 and the ambient temperatures of power converter module 106 during testing.

In particular, in this example, thermal test results 110 collectively indicate a maximum temperature allowable at the electronic temperature sensor in order to maintain the temperature at the output capacitor at or below a pre-defined temperature limit, referred to as a temperature trigger, in the worst-case scenario of operating conditions, airflow rates, airflow directions 120, 121, 122, 123, and ambient temperatures.

For example, if it has been determined that the maximum allowable temperature of the output capacitor is one hundred and twenty degrees Celsius, then the thermal test results 110 define the worst-case scenario derived from all the combinations of the different operating conditions, different airflow rates, different airflow directions 120, 121, 122, 123, and different ambient temperatures required in order to prevent the output capacitor from exceeding one hundred and twenty degrees Celsius.

For example, thermal test results 110 may indicate that for a specific set of operating conditions (e.g., at an output current of thirty five amperes), airflow rates, and airflow directions 120, 121, 122, 123, the temperature sensor (which is a proxy temperature for the capacitor) reads ninety degrees Celsius (or one of the thermocouples 116, 117, 118 contacting the temperature sensor) when the temperature of the capacitor (as read by one of thermocouples 116, 117, 118) is at its maximum allowable temperature of one hundred and twenty degrees Celsius.

Thus, it can be determined that if the electronic temperature sensor measures ninety degrees Celsius, then the maximum allowable output current of power converter module 106 is thirty-five amperes, independent of the air flow rate, airflow directions 120, 121, 122, 123, and the ambient temperature, parameters that are difficult or economically infeasible to measure by power converter module 106 when power converter module 106 is installed in the customer's system board.

Using thermal test results 110, test system 102 generates thermal test data 104 (e.g., thermal test data 104 is the worst-case scenario found in thermal test results 110). Thermal test data 104 is stored at power converter module 106 and used by power converter module 106 during normal operation (e.g., when power converter module 106 is no longer in the thermal test environment depicted in FIG. 1, and thermocouples 116, 117, 118 are removed) to automatically derate its output in order to maintain the thermal limits for the monitored components that were thermally characterized by thermocouples 116, 117, 118 and thermal test results 110.

Although thermal test results 110 have been described in a simplified example of one monitored component and one temperature sensor, power converter module 106 may include a plurality of monitored components, each with a different maximum allowable temperature, along with a plurality of temperature sensors, each modeling, alone or in combination with other temperature sensors, the thermal relationships between their measurements and the components being monitored. Thus, thermal test results 110 may comprise rather complicated data that is non-intuitive. For example, the thermal relationship between one or more temperature sensors on power converter module 106 and a monitored component, such as the power inductor of power converter module 106, may vary widely as the airflow rate, airflow directions 120, 121, 122, 123, input voltage, input current, output voltage, output current, power stage frequency, and the ambient temperature for power converter module 106 are varied. As a result, the thermal test data 104 may comprise a multi-element lookup table that specifies the allowable derated output power of power converter module 106 based on the temperatures measured by a plurality of temperature sensors at power converter module 106, in order to ensure that none of the monitored components exceed their individual maximum allowable temperature under the worst-case operating conditions.

Figure 2:
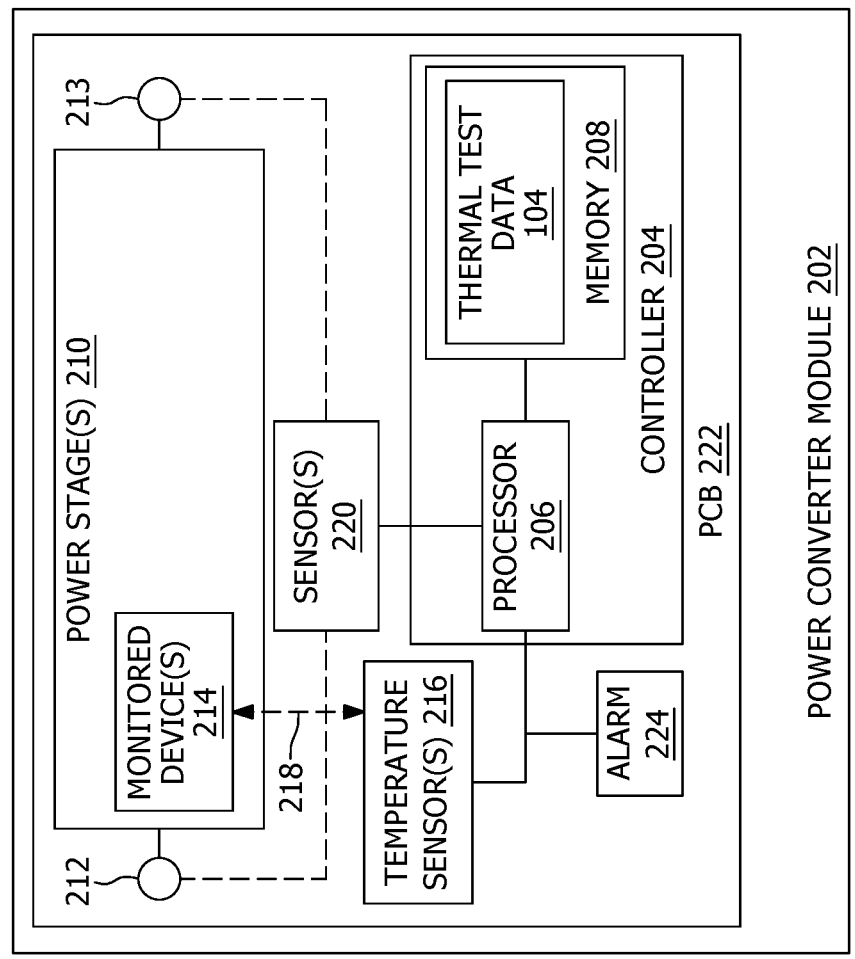
FIG. 2 depicts a block diagram of a power converter module in an exemplary embodiment.

FIG. 2 depicts a block diagram of a power converter module 202 in an exemplary embodiment. Power converter module 202 comprises any component, system, or device that performs the functionality described herein for power converter module 202. Power converter module 202 will be described with respect to various discrete elements, which perform functions. These elements may be combined in different embodiments or segmented into different discrete elements in other embodiments. Power converter module 202 may have the same or a similar design as power converter module 106 of FIG. 1 (e.g., power converter module 202 may be identical to power converter module 106, with thermocouples 116, 117, 118 removed), such that the thermal test data 104 generated during testing of power converter module 106 is applicable to the thermal performance of power converter module 202 under the same or similar test conditions used to generate thermal test results 110.

In this embodiment, power converter module 202 includes a controller 204. Controller 204 includes at least one processor 206 communicatively coupled to a memory 208. Memory 208 stores thermal test data 104 generated during the thermal testing previously described for power converter module 106.

In this embodiment, power converter module 202 includes at least one power stage 210 that is electrically coupled to power terminals 212, 213. In some embodiments, power stage 210 is bidirectional, such that power terminals 212, 213 may alternate as input and output terminals for power converter module 202 depending on the direction of power transfer through power stage 210. In other embodiments, power stage 210 is unidirectional, such that power terminals 212, 213 form one input and one output, collectively, depending on the direction of power transfer through power stage 210.

Power stage 210 may comprise various combinations of DC-DC converters, DC-AC converters, AC-DC converters, and AC-AC converters in different embodiments. When power stage 210 comprises one or more DC-DC converters, power stage 210 may implement various DC-DC converter topologies as desired, including boost converters, buck converters, single-ended primary-inductance (SEPIC) converter, and combinations thereof.

In this embodiment, power stage 210 includes at least one monitored device 214. Monitored device 214 may include any component of power stage 210 that is impractical to monitor directly for temperature, including any type of component described previously. In this embodiment, power converter module 202 includes at least one temperature sensor 216 that is thermally coupled (represented by arrow 218) with monitored device 214 and communicatively coupled with processor 206. Temperature sensor 216 may, for example, be disposed proximate to, but not in contact with, monitored device 214 such that the temperature read by temperature sensor 216 is well correlated with the temperature of monitored device 214. Well correlated means that changes in the measurements of temperature made by temperature sensor 216 generally follow the changes in the temperature of monitored device 214 in a predictable way (e.g., the changes in the measurements of temperature made by temperature sensor 216 generally follow the changes in the temperature of monitored device 214 within a threshold amount of error). This ensures that the temperature read by temperature sensor 216 is an accurate proxy temperature for monitored device 214.

In this embodiment, power converter module 202 includes at least one sensor 220, which is communicatively coupled with processor 206. Sensor 220 is used to determine the electrical operating characteristics of power converter module 202. For example, sensor 220 may be used to measure the input current and/or input voltage at power converter module 202, an output current and/or output voltage at power converter module 202, and/or an operating frequency of power stage 210, etc. In some embodiments, processor 206 determines the operating frequency of power stage 210 without using sensor 220. In one example, processor communicates with components of power stage 210 in order to determine the operating frequency of power stage 210. In another example, processor 206 directly controls the operating frequency of power stage 210, and therefore, processor 206 is able to determine the operating frequency directly.

In this embodiment, power converter module 202 includes a PCB 222, which forms an electrical mounting substrate for controller 204, temperature sensor 216, sensor 220, power stage 210, and power terminals 212, 213. In some embodiments, PCB 222 comprises a laminated sandwich structure of electrically conductive and insulating layers, where the electrically conductive layers include traces, planes, and other features that electrically connect the components of power converter module 202 together. In other embodiments, PCB 222 is formed from other materials, such as ceramic.

In some embodiments, power converter module 202 includes an alarm 224, which may be used by processor 206 in order to indicate when power converter module 202 is operating in an undesirable manner. For example, processor 206 may operate alarm 224 in order to warn the customer that power converter module 202 is derating its output power in order to maintain the temperature of monitored device 214 at or below a pre-defined temperature limit (as measured by proxy using temperature sensor 216). Alarm 224 may comprise an audible alarm, a visual alarm, a communication channel between power converter module 202 and an external device (e.g., the customer's equipment that power converter module 202 is installed in and/or the customer's monitoring equipment), and combinations thereof.

Figure 3:
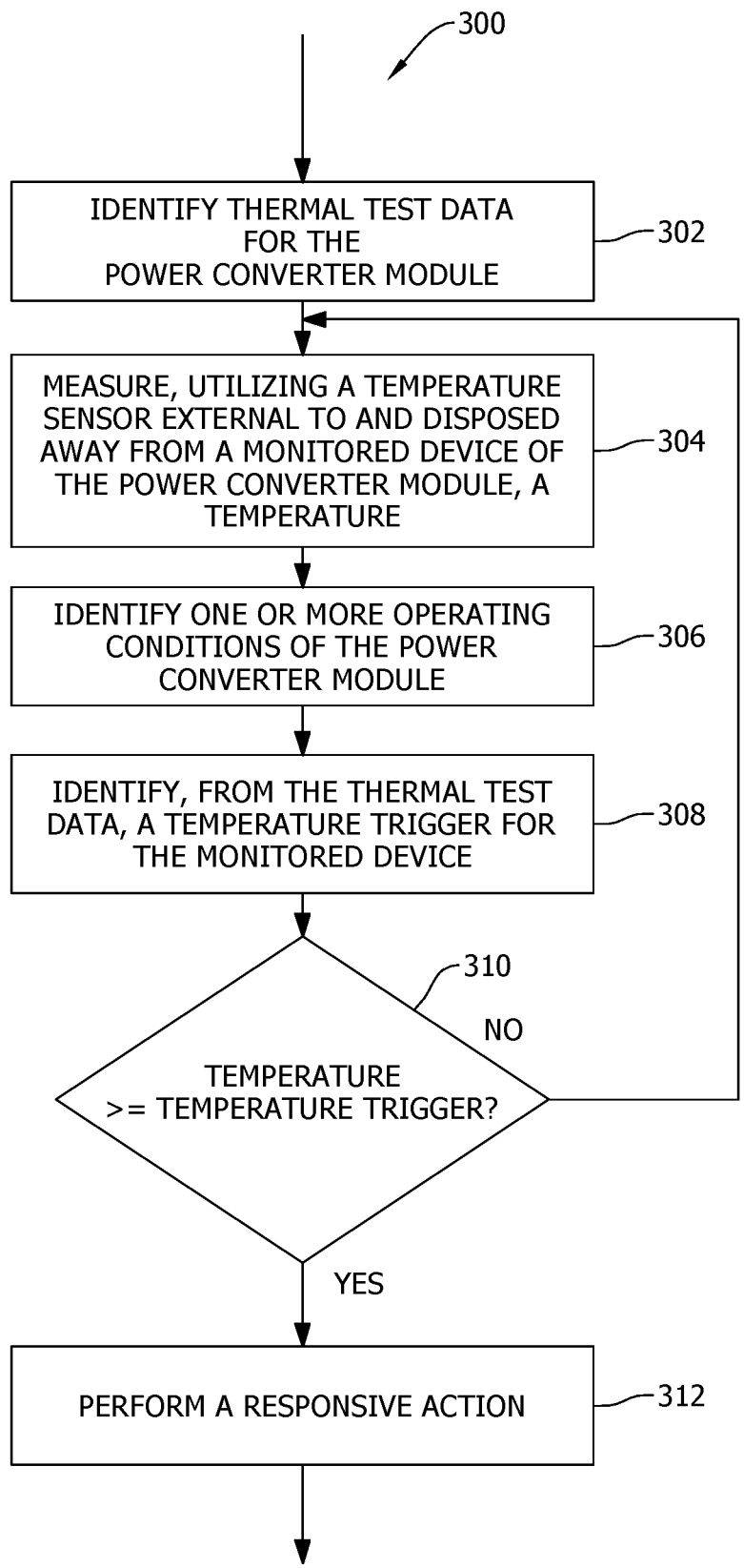
FIG. 3 depicts a flow chart of a method operable by a controller of a power converter module in an exemplary embodiment.
Figure 4:
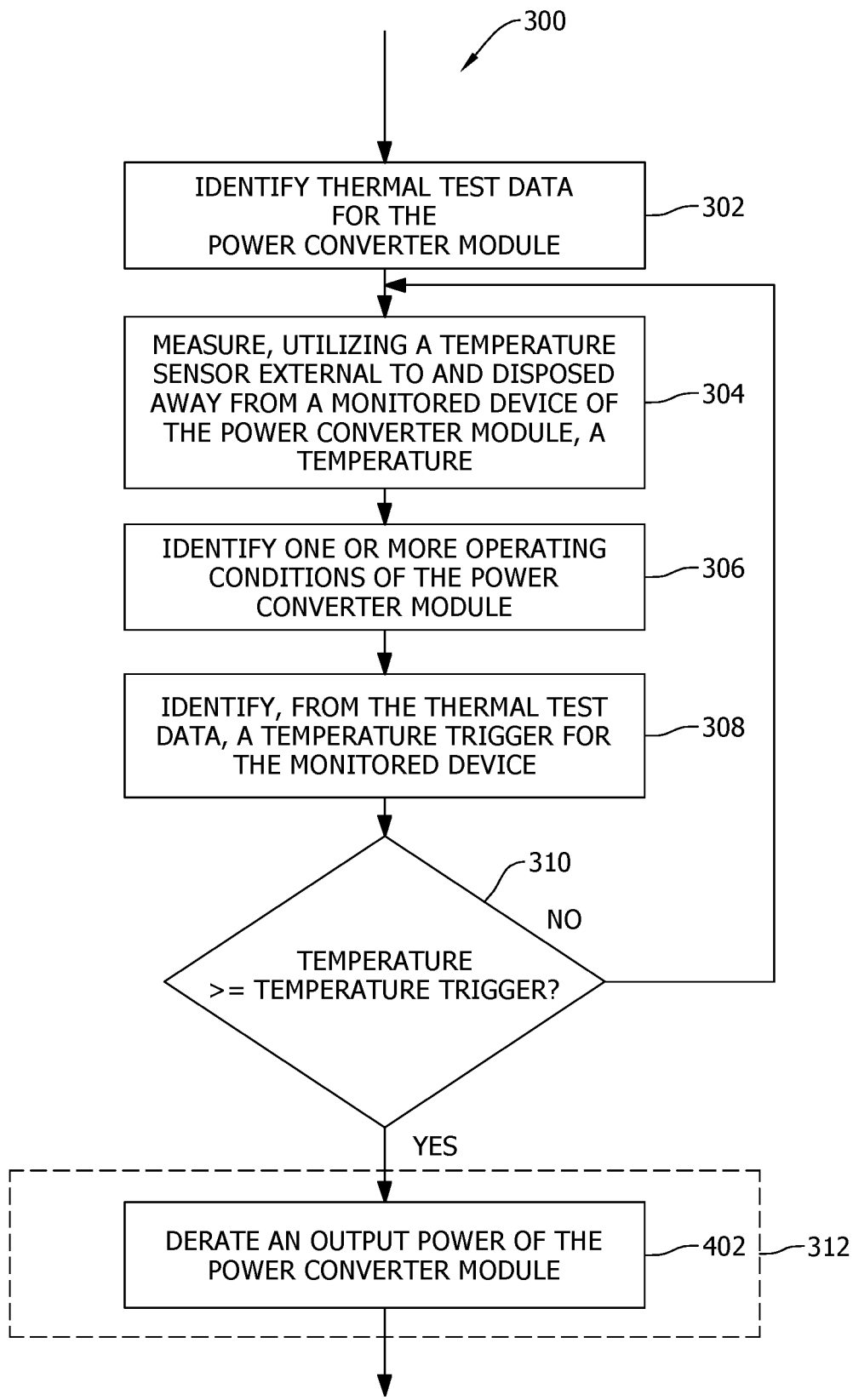
FIGS. 4-7 depict additional details of the method of FIG. 3 in exemplary embodiments.
Figure 5:
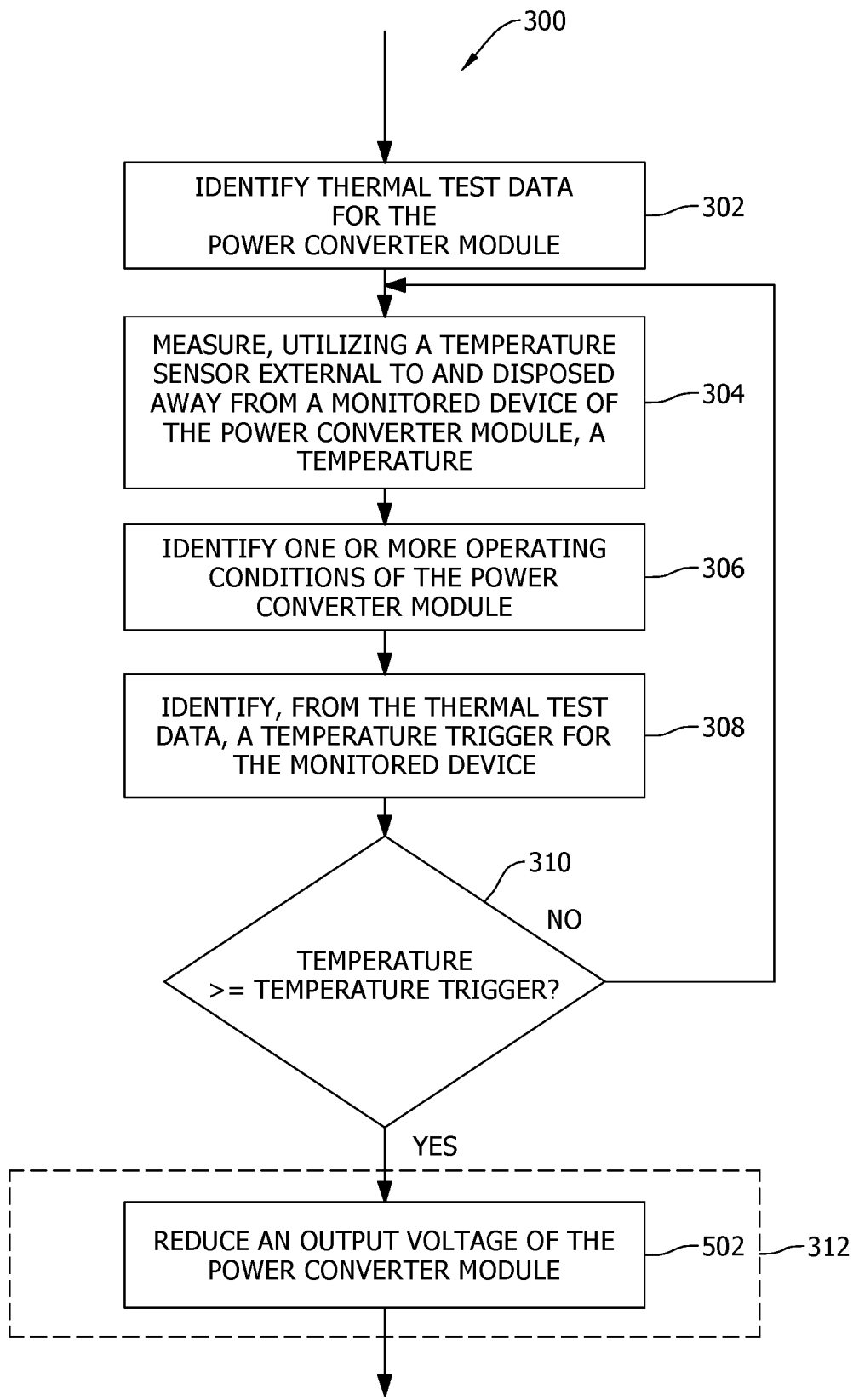
Figure 6:
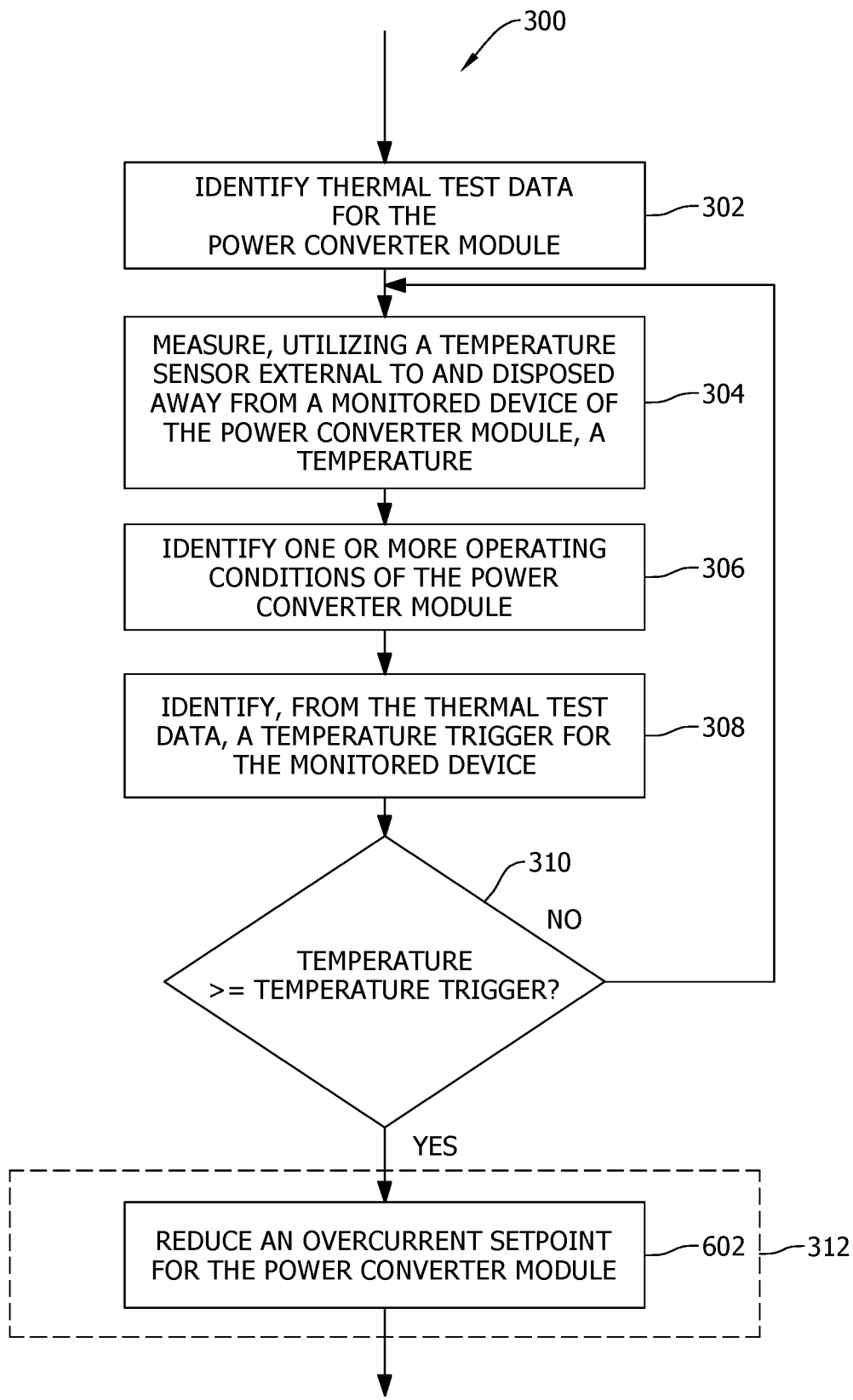
Figure 7:
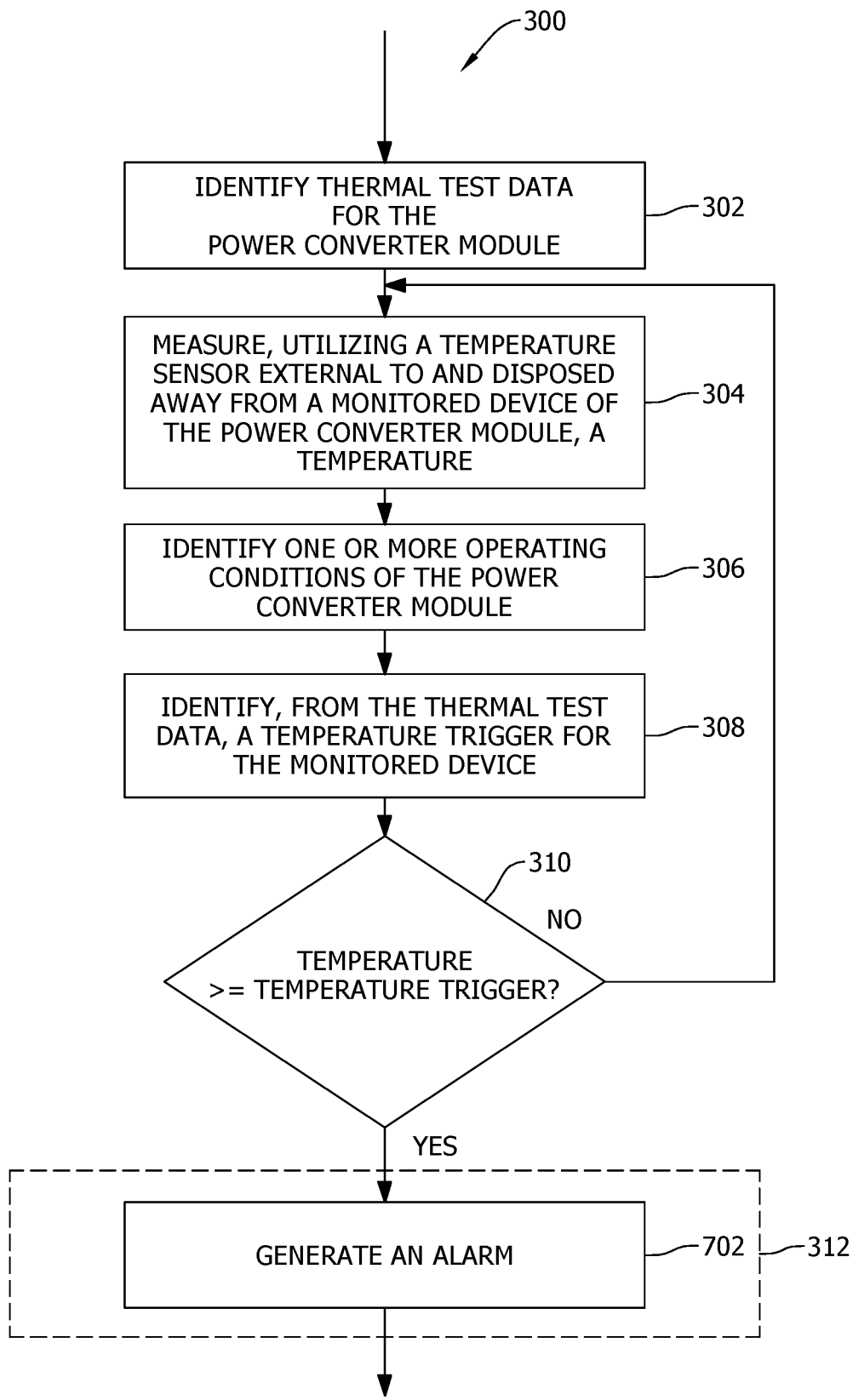

FIG. 3 depicts a flow chart of a method 300 operable by a controller of a power converter module in an exemplary embodiment. FIGS. 4-7 depict additional details of method 300 of FIG. 3 in exemplary embodiments. Method 300 will be described with respect to controller 204 of power converter module 202 (see FIG. 2), although method 300 may be performed by other systems, not shown.

Method 300 is initiated in this embodiment by identifying 302 thermal test data for the power converter module, where the thermal test data maps one or more operating conditions of the power converter module to temperature triggers associated with a monitored device of the power converter module. For example, processor 206 (see FIG. 2) identifies thermal test data 104, stored in memory 208. Thermal test data 104 maps one or more operating conditions of power converter module 202 to temperature triggers associated with monitored device 214.

Method 300 continues in this embodiment by measuring 304, utilizing a temperature sensor external to and disposed away from the monitored device, a temperature. For example, processor 206 utilizes temperature sensor 216, which is external to, and disposed away from monitored device 214, to measure a temperature at the location of temperature sensor 216.

Method 300 continues in this embodiment by identifying 306 one or more operating conditions of the power converter module. For example, processor 206 utilizes sensors 220 to identify one or more of an input current and voltage being supplied to power converter module 202, and an output current or voltage supplied by power converter module 202. Processor 206 may also identify an operating frequency of power stage 210. For instance, processor 206 may communicate with one or more pulse-width modulation (PWM) and/or pulse-frequency modulation (PFM) circuits of power stage 210 in order to directly control and/or determine the current operating frequency of power stage 210.

Method 300 continues in this embodiment by identifying 308, from the thermal test data, a temperature trigger for the monitored device based on the one or more operating conditions. For instance, processor 206 may utilize one or more of the operating conditions previously identified as an index to a lookup table in thermal test data 104, which specifies a temperature trigger for monitored device 214. For example, thermal test data 104 may show that, at a specific combination of input voltage, input current, output voltage, output current, and operating frequency of power stage 210, the temperature trigger for monitored device 214 is eighty-five degrees Celsius (as measured by proxy utilizing temperature sensor 216). The actual temperature of monitored device 214 may be higher, as temperature sensor 216 is a proxy for the temperature at monitored device 214. For instance, the actual temperature of monitored device may by one hundred degrees Celsius, which may be the maximum temperature that monitored device 214 should be subjected to in order to improve the life and reliability of power converter module 202. The maximum temperature may be the design limit for monitored device 214 or a lower temperature selected to improve the life and reliability of power converter module 202 and ensure safety.

Method 300 continues in this embodiment by determining 310 whether the temperature is greater than or equal to the temperature trigger. For example, processor 206 compares the temperature trigger retrieved from thermal test data 104, and communicates with temperature sensor 216 to read the temperature measured by temperature sensor 216. Processor 206 may then compare the temperature and the temperature trigger to determine whether the temperature at temperature sensor 216 is greater than or equal to the temperature trigger. If processor 206 determines that the temperature at temperature sensor 216 is less than the temperature trigger, then processor 206 may continue to monitor the changes in the temperature (as read by temperature sensor 216), the changes in operating conditions of power converter module 202, and the changes in the temperature trigger over time in order to ensure that the temperature at temperature sensor 216 is less than the trigger temperature.

If the temperature is greater than or equal to the temperature trigger, method 300 continues in this embodiment by performing 312 a responsive action. For example, processor 206 performs a responsive action in response to determining that the temperate is greater than or equal to the temperature trigger In an optional embodiment of method 300, performing the responsive action comprises derating 402 (see FIG. 4) the output power of the power converter module. For instance, processor 206 modifies the operation of power stage 210 in order to derate the output power of power converter module 202.

In continuing with this optional embodiment, derating the output power may comprise reducing 502 (see FIG. 5) an output voltage of the power converter module. For instance, processor 206 modifies the operation of power stage 210 in order to reduce the output voltage at one of power terminals 212, 213.

In another optional embodiment of method 300, performing the responsive action comprises reducing 602 (see FIG. 6) an overcurrent setpoint for the power converter module. For instance, processor 206 reduces the overcurrent setpoint for power converter module 202 from its initial overcurrent setpoint to a new lower overcurrent setpoint. The overcurrent setpoint defines a maximum output current of power converter module 202 before power converter module 202 takes a protective action (e.g., power converter module 202 terminates its output).

In another optional embodiment of method 300, performing the responsive action comprises generating 702 (see FIG. 7) an alarm. For instance, processor 206 operates alarm 224 in order to provide an alert to a user indicating that power converter module 202 is operating near its designed temperature limits, due to processor 206 determining that the temperature read by temperature sensor 216 is greater than or equal to the trigger temperature. In some embodiments, generating the alarm may occur in combination with the other activities described above for performing the responsive action.

An example technical effect of the embodiments described herein includes at least one of: (a) automatically derating the power output of a power converter module based on the current operating conditions of the power converter module, thereby improving the life and reliability of the power converter modules and improving safety; and (b) providing real-time or near-real time feedback to users, via an alarm, when the power converter module is entering into an undesirable thermal state of operation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for a power converter module, the controller comprising:
   a memory configured to store thermal test data for the power converter module, wherein the thermal test data maps one or more operating conditions of the power converter module to temperature triggers associated with a monitored device of the power converter module; and a processor configured to:
  identify, from the memory, the thermal test data;
  measure, utilizing a temperature sensor disposed external to and away from the monitored device, a temperature;
  identify the one or more operating conditions of the power converter module;
  identify, from the thermal test data utilizing the one or more operating conditions, a temperature trigger for the monitored device;
  determine whether the temperature is greater than or equal to the temperature trigger; and
  perform a responsive action in response to determining that the temperature is greater than or equal to the temperature trigger.

2. The controller of claim 1, wherein:
the processor is further configured to derate an output power supplied to an output power terminal of the power converter module to perform the responsive action.

3. The controller of claim 2, wherein:
the processor is further configured to reduce an output voltage at the output power terminal to derate the output power.

4. The controller of claim 1, wherein:
the processor is further configured to reduce an overcurrent setpoint for the power converter module to perform the responsive action.

5. The controller of claim 1, wherein:
the processor is further configured to generate an alarm indicating the need to perform the responsive action.

6. The controller of claim 1, wherein:
the one or more operating conditions comprises one or more of an input current for the power converter module, an output current of the power converter module, an input voltage of the power converter module, an output voltage of the power converter module, and an operating frequency of a power stage of the power converter module.

7. The controller of claim 1, wherein the monitored device comprises at least one of a solid-state switch, a capacitor, a transformer, a heatsink, a cold plate, a printed circuit board, and an inductor.

8. A method operable by a controller of a power converter module, the method comprising:
  identifying thermal test data for the power converter module, wherein the thermal test data maps one or more operating conditions of the power converter module to temperature triggers associated with a monitored device of the power converter module;
  measuring, utilizing a temperature sensor external to and disposed away from the monitored device, a temperature;
  identifying one or more operating conditions of the power converter module;
  identifying, from the thermal test data, a temperature trigger for the monitored device based on the one or more operating conditions;
  determining whether the temperature is greater than or equal to the temperature trigger; and
  performing a responsive action in response to determining that the temperature is greater than or equal to the temperature trigger.

9. The method of claim 8, wherein performing the responsive action comprises:
derating an output power supplied to an output power terminal of the power converter module.

10. The method of claim 9, wherein derating the output power comprises:
reducing an output voltage at the output power terminal.

11. The method of claim 8, wherein performing the responsive action comprises:
reducing an overcurrent setpoint for the power converter module.

12. The method of claim 8, wherein performing the responsive action comprises:
generating an alarm.

13. The method of claim 8, wherein:
the one or more operating conditions comprises one or more of an input current for the power converter module, an output current of the power converter module, an input voltage of the power converter module, an output voltage of the power converter module, and an operating frequency of a power stage of the power converter module.

14. The method of claim 8, wherein the monitored device comprises at least one of a solid-state switch, a capacitor, a transformer, a heatsink, a cold plate, a printed circuit board, and an inductor.

15. A power converter module, comprising:
  a printed circuit board (PCB);
  at least one input power terminal coupled to the PCB;
  at least one output power terminal coupled to the PCB;
  a power stage coupled to the PCB and configured to convert an input power applied to the at least one input power terminal to an output power supplied to the at least one output power terminal;
  a temperature sensor coupled to the PCB and disposed external to and away from a component of the power stage; and
  a controller configured to:
    identify thermal test data for the power converter module that maps one or more operating conditions of the power converter module to temperature triggers associated with the component of the power stage;
    measure, utilizing the temperature sensor, a temperature;
    identify the one or more operating conditions of the power converter module;
    identify, from the thermal test data utilizing the one or more operating conditions, a temperature trigger for the component of the power stage;
    determine whether the temperature is greater than or equal to the temperature trigger; and
    perform a responsive action in response to determining that the temperature is greater than or equal to the temperature trigger.

16. The power converter module of claim 15, wherein:
the controller is further configured to derate the output power of the power stage to perform the responsive action.

17. The power converter module of claim 16, wherein:
the controller is further configured to reduce an output voltage of the power stage to derate the output power.

18. The power converter module of claim 15, wherein:
the controller is further configured to reduce an overcurrent setpoint for the power stage to perform the responsive action.

19. The power converter module of claim 15, wherein:
the controller is further configured to generate an alarm to perform the responsive action.

20. The power converter module of claim 15, wherein:
the component of the power stage comprises at least one of a solid-state switch, a capacitor, a transformer, a heatsink, a cold plate, the PCB, and an inductor, and
for the power stage, an output current of the power stage, an input voltage of the power stage, an output voltage of the power stage, and an operating frequency of the power stage.

* * * * *